(12) United States Patent
Tuyls et al.

(10) Patent No.: US 10,910,079 B2
(45) Date of Patent: Feb. 2, 2021

(54) PROGRAMMING DEVICE ARRANGED TO OBTAIN AND STORE A RANDOM BIT STRING IN A MEMORY DEVICE

(71) Applicant: INTRINSIC ID B.V., Eindhoven (NL)

(72) Inventors: Pim Theo Tuyls, Los Altos, CA (US);
Geert Jan Schrijen, Roermond (NL);
Vincent Van Der Leest,
's-Hertogenbosch (NL)

(73) Assignee: INTRINSIC ID B.V., Eindhoven (NL)

( * ) Notice: Subject to any disclaimer, the term of this patent is extended or adjusted under 35 U.S.C. 154(b) by 0 days.

(21) Appl. No.: 16/099,522

(22) PCT Filed: Apr. 28, 2017

(86) PCT No.: PCT/EP2017/060281
§ 371 (c)(1),
(2) Date: Nov. 7, 2018

(87) PCT Pub. No.: WO2017/194335
PCT Pub. Date: Nov. 16, 2017

(65) Prior Publication Data
US 2019/0147967 A1    May 16, 2019

Related U.S. Application Data

(60) Provisional application No. 62/351,358, filed on Jun. 17, 2016.

(30) Foreign Application Priority Data

May 9, 2016 (EP) .................................... 16168697

(51) Int. Cl.
*G11C 17/18*    (2006.01)
*H04L 9/06*    (2006.01)
(Continued)

(52) U.S. Cl.
CPC ............. *G11C 17/18* (2013.01); *G06F 7/588* (2013.01); *G11C 29/52* (2013.01); *H04L 9/0643* (2013.01);
(Continued)

(58) Field of Classification Search
CPC ..................................................... G11C 17/18
(Continued)

(56) References Cited

U.S. PATENT DOCUMENTS 9,747,982 B1 * 8/2017 Shifren .................... G09C 1/00
10,032,521 B2 * 7/2018 Grigoriev .............. G11C 17/16
(Continued)

FOREIGN PATENT DOCUMENTS

EP         0 574 131       12/1993
WO       2011/018414       2/2011

OTHER PUBLICATIONS

Delvaux et al., "Helper Data Algorithms for PUF-Based Key Generation: Overview and Analysis", IEEE Transactions on Computer Aided Design of Integrated Circuits and Systems, vol. 34, No. 6, Jun. 1, 2015, pp. 889-902.*
(Continued)

*Primary Examiner* — Muna A Techane
(74) *Attorney, Agent, or Firm* — Nixon & Vanderhye, P.C.

(57) ABSTRACT

A programming device (110) arranged to obtain and store a random bit string in a memory device (100), the memory device (100) comprising multiple one-time programmable memory cells (122), a memory cell having a programmed state and a not-programmed state, the memory cell being one-time programmable by changing the state from the not-programmed state to the programmed state through application of an electric programming energy to the memory cell.

22 Claims, 9 Drawing Sheets

(51) Int. Cl.
  *H04L 9/08* (2006.01)
  *G06F 7/58* (2006.01)
  *G11C 29/52* (2006.01)
  *H04L 9/32* (2006.01)
  *G11C 17/16* (2006.01)

(52) U.S. Cl.
  CPC .......... *H04L 9/0866* (2013.01); *H04L 9/3239* (2013.01); *H04L 9/3278* (2013.01); *G11C 17/16* (2013.01)

(58) Field of Classification Search
  USPC .......................................................... 365/96
  See application file for complete search history.

(56) References Cited

U.S. PATENT DOCUMENTS

| | | | | |
|---|---|---|---|---|
| 10,095,476 | B2* | 10/2018 | Chen | ................ G06F 7/582 |
| 2005/0210179 | A1* | 9/2005 | Walmsley | ............ B41J 2/04505 |
| | | | | 711/3 |
| 2006/0244099 | A1 | 11/2006 | Kurjanowicz | |
| 2006/0279990 | A1* | 12/2006 | Wan | ................ G11C 16/3418 |
| | | | | 365/185.17 |
| 2008/0247236 | A1* | 10/2008 | Lee | ................ G11C 16/10 |
| | | | | 365/185.19 |
| 2008/0279373 | A1* | 11/2008 | Erhart | ................ H04L 9/3278 |
| | | | | 380/46 |
| 2009/0262565 | A1* | 10/2009 | Shin | ................ G11C 17/18 |
| | | | | 365/94 |
| 2011/0022648 | A1* | 1/2011 | Harris | ................ G06F 7/588 |
| | | | | 708/254 |
| 2012/0030268 | A1* | 2/2012 | Liu | ................ H03K 3/84 |
| | | | | 708/254 |

OTHER PUBLICATIONS

International Search Report and Written Opinion of the ISA for PCT/EP2017/060281, dated Oct. 27, 2017, 27 pages.

Mano et al., "Supplement to Logic and Computer Design Fundamentals 3ed Edition 1 Error Detection and Correction", Jan. 1, 2004, pp. 1-5.

* cited by examiner

|     | 230.1 | 230.2 |
| --- | --- | --- |
| 230 | 0 0 0 0 0 0 0 0 | 0 0 0 0 0 0 0 0 |
| 231 | 1 0 0 0 1 0 0 0 | 0 0 0 0 0 0 0 0 |
| 232 | 1 1 0 0 1 0 0 0 | 0 0 0 0 0 0 0 0 |
| 233 | 1 1 0 0 1 0 1 0 | 0 0 0 0 0 0 0 0 |
| 234 | 1 1 0 0 1 0 1 0 | 1 0 0 1 1 0 0 0 |

240   □  □   ....   □
    241  242         244

251 252

PROGRAMMING DEVICE ARRANGED TO OBTAIN AND STORE A RANDOM BIT STRING IN A MEMORY DEVICE

This application is the U.S. national phase of International Application No. PCT/EP2017/060281 filed 28 Apr. 2017, which designated the U.S. and claims the benefit of U.S. 62/351,358, filed 17 Jun. 2016, and claims priority to EP Patent Application No. 16168697.7 filed 9 May 2016, the entire contents of each of which are hereby incorporated by reference.

FIELD OF THE INVENTION

The invention relates to a programming device, a memory device, a method of programming multiple one-time programmable memory cells, a computer program, and a computer readable medium.

BACKGROUND

In modern devices that are is an increasing need to protect communication from attacks. For example, digital communication may be protected by encrypting it or authenticating it, e.g., using a cryptographic key. Likewise, there is a need to protect data stored on devices. For example, users store financial and personal information on their mobile devices. When such a mobile device is lost, it is desirable that an attacker cannot easily access or modify that information. Also in this situation, the problem may be alleviated by encrypting and/or authentication the data with a cryptographic algorithm such as an encryption or authentication algorithm. Again a cryptographic key is required to perform these tasks.

A consequence of protecting data using cryptographic algorithms, rather than, say, making access itself harder, is that the security problem is increasingly concentrated in the cryptographic key.

There is thus a strong desire to secure cryptographic keys in devices. One approach is to have a secret key that is generated by a central entity and then stored in the device using one-time programmable memory cells. For example, a random cryptographic key is generated and then written to the one-time programmable memory cells. Such one-time programmable memory cells may for example, be fuses or anti-fuses.

There are however, several disadvantages to using such an approach. For example, all keys will be known to the central entity. If the central entity is compromised, e.g., hacked, all keys of potentially millions of devices may be compromised. This problem is especially problematic if the key is stored in a one-time programmable memory. As the memory is one-time programmable, it cannot be overwritten with a new key to repair the security breach.

Moving the selecting of the key and programming of the one-time programmable memory somehow to the device itself, has the problem that a strong source of randomness is needed. Such a source may not be available at the device. Especially during manufacture this is a problem, since the devices are in a virgin state did not yet have a time to acquire sufficient entropy.

Finally, one-time programmable memories are relatively slow, central programming is a time-consuming during, e.g., manufacture of the device. Cost savings would ensue if this step could be moved out of the manufacturing process.

SUMMARY OF THE INVENTION

A programming device arranged to obtain and store a random bit string in a memory device is provided addressing these and other problems. The memory device comprises multiple one-time programmable memory cells, a memory cell having a programmed state and a not-programmed state, the memory cell being one-time programmable by changing the state from the not-programmed state to the programmed state through application of an electric burning energy to the memory cell. The programming device comprises a controllable energy source arranged to supply an electric burning energy, the controllable energy source having a control interface for controlling a size of the burning energy, the controllable energy source being arranged to apply the burning energy to a selected one of the multiple memory cells, a status unit arranged to obtain the number of memory cells of the multiple memory cells that are in the programmed state, a control unit arranged to iteratively apply the controllable energy source to one or more memory cells of the multiple memory cells and increase the size of the burning energy through the control interface, until the number of memory cells in the programmed state reaches a threshold criterion, thus obtaining a random bit string stored in the multiple one-time programmable memory cells.

The random bit string obtained as the pattern of programmed and not-programmed memory cells is unknown outside the memory device. The programming device does not need to know exactly which memory cells were programmed, and which were not. The programming device may be external or internal to the memory device. In the latter case, not even totals such as the total number of programmed memory cells need to be communicated to outside the device.

The entropy in the random bit string is obtained from the physical characteristics of the memory device. Some memory cells naturally burn through with a lower burning energy than other cells. This difference is almost impossible to avoid during manufacture of the device. The random string is thus bound to the physical device. This means that no additional random number generator is needed to produce the random bit string.

Apart from cryptographic purposes, the random string is also useful for identification purposes. The random bit string identifies the memory device on which it was made. Given sufficient memory cells, no two devices will have the same random bit string, making this a naturally unique identifying number. Moreover, it is virtually impossible to produce a device in which the same random bit string will be generated. In an embodiment, the random bit string is communicated as a device identifier.

There are various ways to control the burning of the memory cells, e.g., to steer the process such that the probability distribution of the random bit string resembles the uniform distribution more closely, and/or that the string has sufficiently high entropy.

The one-time programmable memory cells have a further advantage over other techniques of secure storing keys, e.g., using volatile SRAM memory as a physical unclonable functions, which is a much lower failure rate. The estimate of failure of one-time programmable memory cells programmed according to the invention is in some embodiments of the order of 1 in a hundred. The inventors have realized that at this rate conventional error correcting systems such a large error correcting codes are overly complicated. A simplified manner of producing helper data to correct such errors is to compute a hash over at least a part of the data in the multiple memory cells after the threshold criterion has been reached. Using the hash faulty memory cells may be found by trying only a limited number of corrections, e.g., trying all 1-bit errors, or all 2-bit errors, etc. By computing multiple hashes over overlapping data, faulty memory cells may be found even more quickly.

The memory device and the programming device are electronic devices. The memory device, with or without an internal programming device may, e.g. be a mobile electronic device, such as a mobile phone, etc., a set-top box, a smart card, a computer. The random string may be used as an identification string, a cryptographic key, a seed of a cryptographic key, etc.

For example, the memory device, say a mobile phone, may store further data, e.g., photos, mail, text etc., encrypted and/or authenticated using a key derived from the random string.

The method of programming multiple one-time programmable memory cells as described herein may be applied in a wide range of practical applications. Such practical applications include: protecting of stored data by encryption and/or authentication, protection of communication, e.g., using the random string as a seed for an asymmetric key, use of the random string as a device identifier, e.g., in digital communication with the memory device, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a memory device 100 and a programming device 110, FIGS. 2a, 2b, 2c, 2d, 2e, 2f, schematically illustrates examples of programming multiple one-time programmable memory cells, FIGS. 3a, 3b, 3c, 3d schematically illustrates examples of computing and using helper data, FIG. 4 schematically shows an example of an embodiment of a method of programming multiple one-time programmable memory cells, FIG. 5 schematically shows an example of an embodiment of a memory device 500 and a programming device 510, FIG. 6a schematically shows a computer readable medium having a writable part comprising a computer program according to an embodiment, FIG. 6b schematically shows a representation of a processor system according to an embodiment.

| List of Reference Numerals in FIGS. 1 and 5: | |
|---|---|
| 100 | a memory device |
| 110 | a programming device |
| 120 | a memory block |
| 122 | multiple one-time programmable memory cells |
| 130 | a controllable energy source |
| 140 | a status unit |
| 150 | a control unit |
| 160 | a helper data memory |
| 162 | an authentication unit |
| 164 | a validation unit |
| 500 | a memory device |
| 510 | a programming device |
| 530 | a controllable energy source |
| 531 | a controllable energy source interface |
| 540 | a status unit |
| 541 | an internal status unit |
| 550 | a control unit |

DETAILED DESCRIPTION OF PREFERRED EMBODIMENTS

Figure 1:
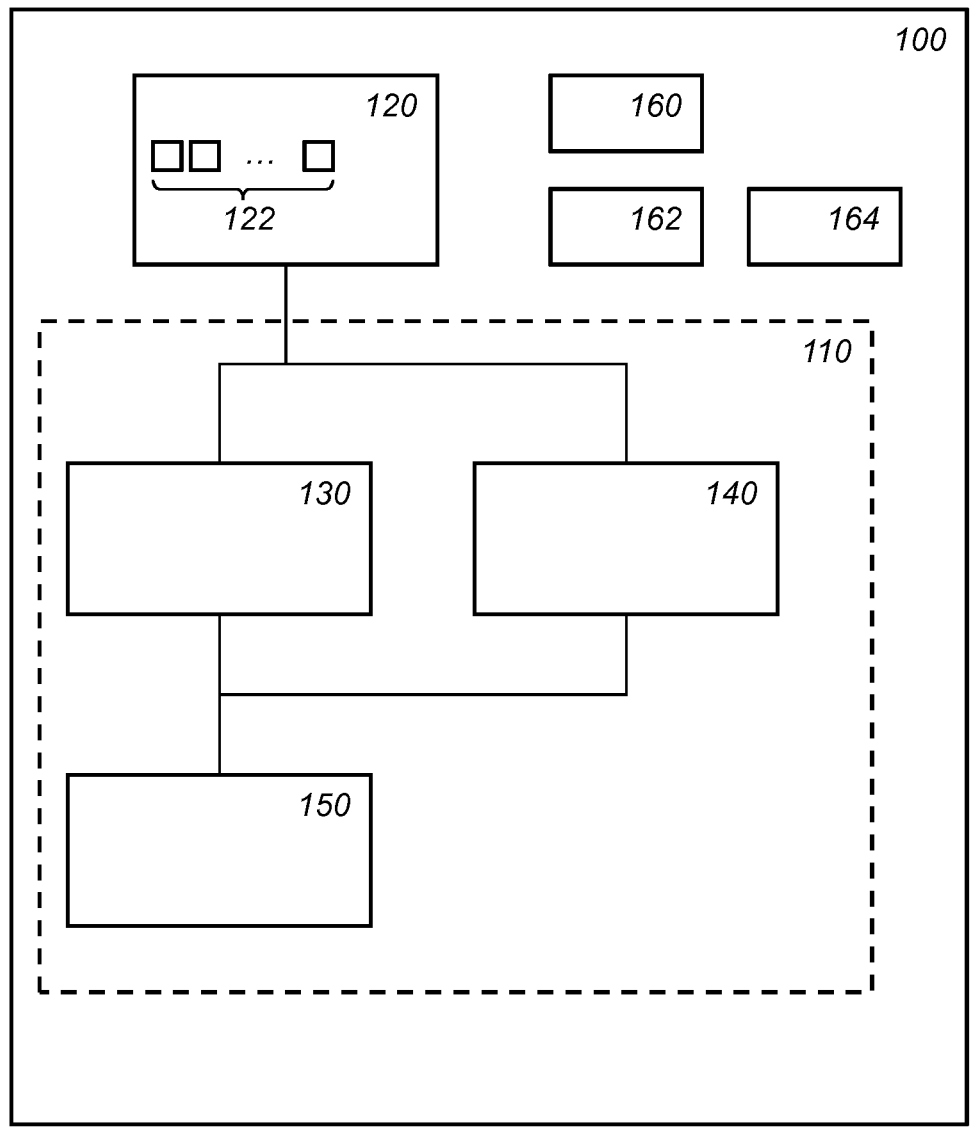

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

FIG. 1 schematically shows an example of an embodiment of a memory device 100 and a programming device 110. In the embodiment shown in FIG. 1, memory device 100 comprises programming device 110. The latter is not necessary, below an embodiment will be disclosed in which the programming device is external to the memory device; variants being described with reference to the internal programming device also apply to the external programming device.

Memory device 100 comprises multiple one-time programmable memory cells 122. All of the memory cells may have a same or similar design and/or operate along the same or similarly. The memory cells have a programmed state and a not-programmed state. Initially a memory cell is in the not-programmed state. By applying an electric burning energy to a memory cell, the memory cell may be changed from the not-programmed state to the programmed state. The latter cannot be reversed, making the memory cell one-time programmable. The memory cells are a form of non-volatile memory. The number of memory cells may be different from 128, e.g., say 64 or more, 128 or more, 160 or more, 192 or more, 256 or more, etc.

Many types of one-time programmable memory cells are known. For example, the memory cells can be either in a high resistance state or a low resistance in response to an electric programming energy, such as a programming voltage or current. For example, the memory cells may be fuses or antifuses. A fuse has a low resistance in the not-programmed state and is designed to permanently break an electrically conductive path, e.g. when the current through the path exceeds a specified limit to reach the programmed state. An antifuse has a high resistance in the not-programmed state and is designed to permanently create an electrically conductive path, e.g., when the voltage across the antifuse exceeds a certain level. In an embodiment, both fuses and antifuses are used. Although different kinds of fuses exist (e.g. laser fuses, polyfuses, anti-fuses), in an embodiment fuses are used that are electronically programmable; They are either programmed, e.g., with a power source external to the chip or by using on-chip charge-pumps.

One-time programmable memory cells are manufactured, e.g., in FGPA devices manufactured by Actel and Quicklogic, e.g., in DRAM devices by Micron. A detailed example of an antifuse is provided in US patent application 2006/0244099 A1 (incorporated herein by reference) and in the references quoted therein.

In an embodiment, memory cell 100 comprises an addressing mechanism for addressing individual memory cells of multiple memory cells 122. For example, memory block 120 may comprise multiple bit lines and multiple word lines. Each memory cell being connected to one of the multiple bit lines and one of the multiple word lines. By selecting a combination of a bit line and word line the memory cell connected to the combination is selected.

For example, memory block 120 may comprise a plurality of anti-fuse transistors arranged in rows and columns. A bit line is coupled to anti-fuse transistors in a column of anti-fuse transistors, and a word line is coupled to anti-fuse transistors in a row of anti-fuse transistors.

The programming device is arranged to obtain and store a random bit string in multiple memory cells 122. Having a random bit string is desirable as it may be used as a globally unique identifier. For example, a random bit string of 128 bit is virtually guaranteed to be unique, even though no bookkeeping is required to ensure the uniqueness. Instead a cryptographic key may be derived from the data in the multiple memory cells, or a subset thereof. For example, a random bit string of 128 bit may be used as a symmetric 128-bit key. For example, a hash of a slightly longer random bit string, say of 160 bit, may be truncated to 128 bit and used as a symmetric 128-bit key. The latter step increases entropy and reduces bias. A cryptographic key may be used to authenticate data, e.g. by computing and verifying message authentication codes, or may be used to protect confidentiality of data, e.g., by encrypting and decrypting the data. The random bit string may also be used as a seed to obtain an asymmetric key. For example, the bit string may be used to select an ECDSA key, say by selecting a random point on an elliptic curve.

To derive a key first a key derivation function (KDF), such as described in the internet standard RFC 2898, may be applied to the data in the multiple memory cells. In an embodiment, the key derivation function is applied to more memory cells than bits in the key. For example, the key derivation function is applied 160 bits taken from 160 one-time programmable memory cells to derive a 128-bit key. If information related to the memory cells may leak to an attacker, e.g., in the form of helper data, application of a key derivation function is advantageous.

For example, during an enrollment phase, memory device 100 is programmed by programming device 110. During later use phases, the content of multiple memory cells 120 is used to, e.g. derive a cryptographic key.

The memory cells have been designed for a particular electric programming energy. By applying the electric programming energy, a memory cell may be brought from the not-programmed to the programmed state.

Programming device 110 comprises a controllable energy source 130 arranged to supply an electric burning energy. The size of the electric burning energy may be controlled through an interface of controllable energy source 130. The burning energy may be applied to a selected one of the multiple memory cells. Which memory cell is selected may, e.g., be controlled through the interface, and/or through the addressing mechanism, etc.

If the burning energy is high enough, e.g., as high as a writing level, e.g., as high as the programming energy, there is a high chance that a memory cell will change to the programmed state. However, if the burning energy is controlled to a lower level the probability that a memory cell will switch is lower. By increasing the burning energy from 0 to the writing level, the chance that a not-programmed memory cell will change to the programmed state increases from 0 to 1 (or very nearly to 1). Controllable energy source 130 may be arranged to control one or more of a voltage, current and duration to control the size of the burning energy.

For example, controllable energy source 130 may comprise one or more voltage charge pumps arranged to provide a controllable voltage. For example, controllable energy source 130 may comprise a controllable generator to generate timing pulses to charge a charge pump.

For example, controllable energy source 130 may be arranged to control a duration of the burning energy, say at a fixed voltage, or at a variable voltage. For example, controllable energy source 130 may be arranged to control a voltage, say at a fixed duration, or at a variable duration. Similarly, controllable energy source 130 may control current and duration.

For example, programming device 110 may comprise a burning energy table, e.g. stored in a non-volatile memory. The burning energy table indicates increasing levels of burning energy used to program the multiple memory cells. For example, memory device 100 may comprise a burning mechanism having an interface such as a settings register. By writing the appropriate code in the setting register the programming device can cause a particular burning energy to be applied to a memory cell. For example, the setting of the setting register needed to achieve a particular burning energy can also be stored in the burning energy table.

A One-time programmable (OTP) memory may be used as physical unclonable function (PUF). When a burning energy is used that is nearly high enough for programming the memory cells, some memory cells will be programmed whereas others will remain un-programmed when applying such an intermediate programming voltage level to a large array of cells. The particular burning energy that is needed to program a particular cell depends on the exact manufacturing of the cell, and cannot be predicted beforehand. This makes the one-time programmable memory cells suitable to build a physically unclonable function (PUF) from.

Programming device 110 comprises a status unit 140 arranged to obtain the number of memory cells of the multiple memory cells that are in the programmed state. For example, memory device 130 may comprise a reading unit to read if a selected memory cell is in the not-programmed or in the programmed state. For example, the reading unit may comprise a sensing unit arranged to measure a resistance in a memory cell. Depending on the type of memory cell, a low or high resistance indicates a programmed or not-programmed state.

To determine if a one-time programmable memory cell is in the not-programmed or programmed state, also referred to as reading, measuring or sensing the cell, a sense amplifier of the memory device may be coupled to the memory cell, e.g., through the addressing mechanism. For example, the sense amplifier may be connected to a bit line and/or address line.

Sensing a one-time programmable memory cell may proceed in different manners, depending on the type of cell. For example, a one-time programmable memory cell may be read by positively biasing a gate of the cell and sensing the gate to drain current. For example, the sensing may be single-ended sensing.

The sense amplifier may be a current sense amplifier that compares the current of a bit line or word line to a reference current. Also a bit line voltage or current may be compared to a reference signal carried on another line.

In an embodiment, a current sense amplifier is used, e.g. of the type used in Flash memories, in which the bit line current is compared to a reference current. In an embodiment, anti-fuses are used in which the programmed-resistance varies from cell to cell. In an embodiment, the settings of the sense amplifier and/or the reference current may be set through a setting register of the memory device, e.g., of the sense amplifier.

Status unit 140 may obtain the number of programmed memory cells by reading each memory cell, determining if the cell is in the programmed state, and counting the cell if it is. Status unit 140 may also keep a running count; starting the count at 0, and increasing the count each time a not-programmed cell is changed to programmed. For example, status unit 140 may be arranged to read a cell before the burning energy is applied, if the cell is already programmed, status unit 140 can ignore the cell, if the cell is not yet programmed, then the sensing unit may read the cell after the burning energy is applied and count the cell if it is programmed. Alternatively, which cells are programmed and not-programmed may be kept in a volatile memory, say a RAM, which has a shorter access time than memory block 120.

Status unit 140 may report the number as an absolute number, say 39 memory cells are programmed, or as a percentage, say as 30.5% (assuming there are 128 memory cells).

Programming device 110 comprises a control unit 150. Control unit 150 is arranged to iteratively apply controllable energy source 130 to one or more memory cells of the multiple memory cells and increase the size of the burning energy through the control interface, until the number of memory cells in the programmed state reaches a threshold criterion. Because it is unpredictable which memory cells will program at a particular burning energy, a random bit string is thus obtained and stored in the multiple one-time programmable memory cells.

For example, in a first iteration, control unit 150 may set the burning energy to a first level, and program a first subset of the memory cells. If the threshold criterion is not reached then, in a second iteration, control unit 150 may set the burning energy to a second level, and program a second subset of the memory cells. The first and second subset may or may not overlap. For example, the second subset may have no overlap with the first subset. For example, the second subset may comprise the not-programmed memory cells of the first subset. For example, the first and second subset may be equal, or even both equal to all multiple memory cells.

The threshold criterion may be reached half-way an iteration. For example, control unit 150 may be arranged to obtain the percentage of programmed memory cells after each application of the burning energy. When the percentage of programmed memory cells is at least a threshold percentage, the threshold criterion is reached and the current iteration and further iterations are terminated. In this case, the threshold percentage may be selected at 50%.

There are several ways in which programming device 110 may deal with memory cells that are already programmed. For example, the programming device 110 may ignore that some memory cells are already programmed and reprogram a memory cell with a higher burning energy regardless of its state. Another approach is to sense a memory cell before programming it or to keep track of which cells are programmed. This will avoid programming a memory cell twice, but it has the disadvantage that the programming device needs access to content of individual memory cells. Below we will mostly assume that further iterations apply burning energy only to memory cells that are still in the not-programmed state. The latter may be achieved by keeping track of the state of each memory cell, e.g., in a memory, e.g., a volatile memory, or by sensing a cell before programming it. However, the programming device may be agnostic about the state of individual memory cells. For example, the programming device may apply the burning energy of an iteration to all cells, or all cells in a group, etc., regardless of the state of the cells. This may mean that a cell already in the programmed state is programmed again. This may reduce the speed of the method somewhat, but on the other may increase security since information about the state of the cells is not required in most parts of the programming device.

Figure 2A:

FIG. 2a illustrates the latter programming scheme. Shown are multiple memory cells 210. In FIG. 2a, 16 memory cells are used, although the actual number of memory cells may be much higher. Memory cells 210 are in the not-programmed state, which has been indicated with a '0'. Programmed cells are indicated with a '1'. Initially, control unit 150 sets the burning energy to a first level.

In an embodiment, control unit 150 is arranged to apply the burning energy to each not-programmed memory cell before increasing the burning energy, unless the iteration terminates early. For example, control unit 150 may apply the first level burning energy to each memory cell in turn. After this, some memory cells are programmed; six in this example (37.5%), as shown in memory cells 211. In an embodiment, the threshold percentage is set at 50%, and reaching the threshold criterion is determined after each programmed cell. After applying the burning energy to each memory cell, control unit 150 increases the burning level to a second level, and applies the increased burning energy to the not-programmed cells. Two additional cells are now programmed, indicated with an arrow. Assuming the cells are programmed from left to right, this iteration terminates at the second arrow, since at that point exactly 8 cells (50%) are programmed. Note that the final 0 in the row 212 is not programmed with the second level burning energy.

In the example illustrated in FIG. 2a, control unit 150 verifies if the threshold criterion has been reached after each cell to which the burning energy is applied. The result is that it can almost be guaranteed that exactly 50% of the memory cells will be in the programmed state after the threshold criterion is reached. (For example, in case of faulty cells it may still happen that the device stops short of reaching exactly 50%; for example, in case of an odd number of cells, the percentage may slightly overshoot a 50% threshold criterion.)

In an embodiment, an iteration only terminates as the end of the memory array. This avoids a situation in which the probability of being programmed will become higher for the first part of the memory array than for the second.

A potential drawback of the above embodiment is that the random string created in this manner will have a percentage of 1-bits that is very close to 50%. Although on average a random string will have a 50% percentage of 1-bits, a uniformly random bit strong, e.g., drawn at random from all possible bit string, may also have a higher or lower percentage of 1 bits. Generally, it is preferred that the distribution of the random bit string in memory cells 120 resembles the uniformly random distribution. The embodiment below achieves a larger spread in the percentage of one bits.

Figure 2B:

In an embodiment, control unit 150 determines a number of memory cells of the multiple memory cells to which a particular burning energy is applied before control unit 150 evaluates the threshold criterion before an iteration and is at least two. In this case, a threshold percentage of 50% will likely lead to an overshoot of the number of 1 bits. Accordingly, this is corrected by selecting a threshold percentage below 50%. In FIG. 2b, the burning energy is applied to a group of 8 memory cells before the threshold criterion is evaluated. For example, the memory cells may be partitioned in groups of, in this case, 8 cells. Two groups of 8 cells each are shown at multiple cells 220, all of which are in the not-programmed state. The threshold percentage has been set at 40%. More generally, in an embodiment, the multiple memory cells are partitioned into multiple groups of memory cells, the control unit being arranged to apply the controllable energy source to all memory cells in a group of memory cells and to evaluate the threshold criterion after applying the controllable energy source to all memory cells in a group. The status unit may be arranged to determine a number of memory cells programmed in a group, e.g., in the previous group.

Referring to FIG. 2b, the memory cells 220 have been portioned into groups. Two groups are shown: group 220.1 and group 220.2. For example, control unit 150 may apply the first level burning energy to each memory cell of cells 220 in turn; evaluation the threshold criterion after completing a group. After this, some of the memory cells are programmed; five are shown in this example (31%), as shown in memory cells 221. At the end of this iteration the burning energy is increased to the second level. As the percentage of programmed cells is below the threshold percentage (31%<40%), the next group of cells is also programmed. In this second iteration, first group 220 is programmed first.

After all memory cells in group 220.1 are programmed with the second level burning energy, an additional memory cell is programmed (indicated with an arrow). At this point the threshold criterion is applied. However, as 6 out of 16 cells (38%) is still below the threshold percentage, the second level burning energy is also applied to the cells in the next group (group 220.2). After group 220.2 is programmed, three additional cells are programmed in this example. As a result, in total 9 out of 16 memory cells are in the programmed state (56%). In this example, the final percentage of cells that are in the one state is larger than 50%.

Note that in this example, if no additional cells were programmed then the final percentage of cells that are in the programmed state would have been as low as 38%, but if all cells in the second group 220.2 programmed the final percentage of cells that are in the programmed state would have been as high as 69% is. In other words, the distribution of the percentage of 1 bits is no longer necessarily very close to 50%, and thus resembles more closely the uniform distribution.

The threshold percentage may be set by experimentation on memory cells with the same design. The threshold percentage may lead to a distribution that, although not constant at 50% may be lopsided. Moreover, environmental influences such as the temperature may impact the likelihood that a cell programs with a given burning energy. In an embodiment, as in the previous embodiment, the control unit 150 applies the burning energy to the memory cells in a group of memory cells before evaluating the threshold criterion. The groups have at least two cells in them. Note that, a group may be as large as all of the multiple memory cells. In an embodiment, the threshold percentage is determined from an expected number of memory cells that will change from the not-programmed state to the programmed state.

In embodiment, a group comprises 8 or more cells, 16 or more cells, etc. For example, there may be at least 2, at least 4 groups, etc.

Below a further example is given of a threshold criterion that may be applied after each group. Let a: the number of programmed cells b: the number of expected cells that will successfully program in the next group n: the number of cells In embodiment, Control unit 150 continues to apply the burning energy to the next group if $a \leq \frac{1}{2}n - \frac{1}{2}b$, or equivalently, if $a/n \leq \frac{1}{2} - b/2n$. If the condition does not hold, the threshold criterion is reached and control unit 150 terminates. This gives a threshold percentage of $50\% - (b/2n)*100\%$. This criterion ensures that, on average, programming the next group will bring the number of programmed memory cells closer to 50%, and avoid a lopsided distribution.

For example, take n=100, b=5, programming will continue for a=45, 46 and 47 but stop for a=48. Note that this criterion is independent of the size of the groups and the probability of converting a not-programmed cell to a programmed cell.

In an embodiment, control unit 150 determines the number of memory cells of the multiple memory cells to which a particular burning energy is applied from a current number of memory cells of the multiple memory cells being in the programmed state (a). For example, the number of memory cells may be selected as $(\frac{1}{2}n-a)/p$, wherein p is the probability to convert cells from a not-programmed state to a programmed state. For example, at end of a first group on the basis of which the probability is estimated, the number of cells to be programmed next is computed as above.

Both the number of expected cells that will successfully program in the next group (b) and the probability to convert (p) may be estimated by control unit 150, e.g., from the number of cells that successfully programmed in the previous group or groups.

In general status unit 140 may be arranged to obtain the information from the memory device required by control unit 150 to evaluate the threshold criterion. For example, status unit 140 may directly inspect the memory cells, or interact with a corresponding interface of the memory device.

There is no requirement that all memory cells in the multiple memory cells are programmed at the same time.

Figures 2C, 2D, 2E:

For example, FIG. 2c shows multiple memory cells 230 partitioned into two groups: group 230.1 and 230.2. Of each group 8 memory cells are shown. The groups may be much larger. For example, for 256 memory cells, the two groups may be each 128 cells. In an embodiment, the first group is smaller than the second group, e.g. the number of cells in the first group is at most 50% of the number of cells in the second group. For example, the first group may have 64 cells, whereas the second group has 192 cells.

Control unit 150 is arranged to iteratively apply the controllable energy source to the memory cells of the first group and increase the size of the burning energy through the control interface, until the number of memory cells in the first group in the programmed state reaches an intermediate threshold criterion. For example, control unit 150 may apply the burning energy to each cell in the first group, then evaluating the intermediate threshold criterion and increase the burning energy for the next iteration if the criterion has not been reached yet. In this case, the intermediate threshold criterion may be that a percentage of the cells has been programmed. The percentage may be 50% or somewhat smaller than 50%. After programming the first group is finished, the burning energy is applied to the cells in the second group. After writing the second group the method may terminate, or further checks may follow.

In FIG. 2c, the group 230.1 is programmed with an increasingly larger burning energy until at 233, e.g., until 50% of the cells are programmed. Until that point, the cells in the second group 230.2 are not programmed yet. Finally, the burning energy used in the final iteration of first group 230.1 is applied to all cells in second group 230.2. An effect of this embodiment is that the burning energy after the first group is finished is close to the energy that will cause 50% of the cells to program. By applying this burning energy in the second group, a string will be obtained in the second group that resembles the uniform distribution closer. In an embodiment, the cells in the first group may be preferably used together with the cells in the second group, e.g., to derive a cryptographic key, for example, by hashing the content of the first and second group, or the first group may be discarded. This embodiment reduces the programming time considerably, as only the first group needs to be programmed until a suitable burning energy is found.

The use of groups is not required. For example, in an embodiment the control unit is arranged to apply the controllable energy source to all memory cells of the multiple memory cells in an iteration before increasing the size of the burning energy. For example, this may be done in the first iteration or in the first few iterations, as the risk of overshooting the number of programmed cells is less in this phase. This may also be done in a final iteration when a correct burning energy has been obtained. In an embodiment, the control unit is arranged to apply the controllable energy source to all memory cells of the multiple memory cells in each iteration. The latter may be used for example, if the burning energy can be increased finely grained.

In an embodiment, the status unit is arranged to determine a number of memory cells programmed in a group of memory cells in a previous iteration. Control unit 150 is arranged to
- increase the size of the burning energy if the number of memory cells programmed in a previous iteration is below a lower bound, and/or
- decrease the size of the burning energy if the number of memory cells programmed in a previous iteration is above an upper bound.

FIG. 2d illustrates this approach. Shown in FIG. 2d are multiple memory cells 240 partitioned into multiple groups. Shown are groups 241, 242 and 244. Control unit 150 is configured to apply a burning energy to the memory cells in first group 241. If the number of programmed cells in group 241 is below a lower bound, control unit 150 increases the burning energy. If the number of programmed cells in group 241 is above an upper bound, control unit 150 decreases the burning energy. Next group 242 is programmed with the updated burning energy. After group 242 the burning energy is updated again, until at some point final group 244 is programmed. Control unit 150 may conclude by programming once more all cells with the final burning energy, or all groups that were programmed with a lower burning energy. The groups may increase in size. The lower and upper bounds need not be the same for the different groups.

In general, after the threshold criterion has been reached, control unit 150 may increase the electric burning energy to a writing level which will typically be higher than the burning energy of the final iteration. Control unit 150 may apply the increased electric burning energy to memory cells in the multiple memory cells that are in the programmed state. For example, memory device 100 may comprise a reading unit to which control unit 150 has access. Using the reading unit, control unit 150 may determine which memory cells are in the programmed state. The writing level burning energy may then be applied to those memory cells that are already programmed. This has the advantage that memory cells that made the transition from not-programmed to programmed poorly are now more firmly programmed, thus reducing the chance that the cell may later temporarily or permanently revert to the not-programmed state, e.g., under different environmental circumstances. Note even in this case, the use of helper data as discussed below may be used, as some memory cells may be broken or unreliable. FIG. 2e illustrates an embodiment. Shown is the final state of FIG. 2a. Control unit 150 determines which memory cells are programmed; indicated with arrows. The burning energy of the writing level is now applied to programmed cells. The latter requires access of the programming device to the state of individual cells. To improve this feature, the programming device, or only a unit for rewriting programmed cells may be integrated in the memory device.

Figure 2F:

FIG. 2f shows a first multiple of one-time programmable memory cells 251 and a second multiple of one-time programmable memory cells 252. The control unit is arranged to program the first multiple of one-time programmable memory cells 251 to obtain and store a random bit string, e.g., as indicated above. After programming the first multiple 251, control unit 150 applies a statistical randomness test to first multiple memory cells 251. If the statistical randomness test indicates that the entropy of first multiple 251 is insufficient, the control unit 150 proceeds to program the second multiple of memory cells 252.

The statistical randomness test may determine if the entropy in the multiple memory cells is sufficient. For example, the randomness test may compute a value based on the data in the first multiple memory cells. If the value is in a pre-determined range, the entropy is estimated to be sufficient. The entropy may be Shannon entropy used in information theory. Many suitable randomness tests may be used, for example, the runs test or long runs test defined in Fips 140-1, or Fips 140-2. These tests may be adopted for a shorter number of bits in the multiple memory cells. For example, the randomness test may be a long runs test. In the long run test, the longest run of consecutive 1's or consecutive 0's in the multiple cells is determined. If the length of the longest run is above a threshold, the entropy is considered insufficient.

For example, if intermediate multiple cells 251 has a too long run this may indicate insufficient entropy in this data. By adding multiple cells 252 the entropy can be increased.

If the number of different burning levels is small, it may happen that the distribution of programmed cells concentrates in some parts of the multiple memory cells. For example, suppose that the probability of converting a memory cells from not-programmed to programmed at a first level of the burning energy used in the first iteration is ⅓ and that the probability at a second level of the burning energy used in the second iteration is ⅔. If the threshold criterion is evaluated multiple times in the second iteration and aims for a percentage of 50% programmed memory cells, then the second iteration can be expected to program about half of the memory cells, since ⅔×½+⅓×½=½. This would mean that about ⅔ of the memory cells in a first half of the memory cells is programmed versus about ⅓ of the memory cells in a second half of the memory cells. It is desirable that such a deviation from the uniform distribution is obfuscated from attackers. In an embodiment, the programming device comprises a random number generator. The one or more memory cells of the multiple memory cells to which the burning energy is applied is determined by the control unit from random numbers generated by the random number generator. For example, the random number generator may use a pseudorandom number algorithm seeded by the content of a group of memory cells, say programmed in a previous iteration. Note that the random number generator may be of a low quality as it is not intended to replace the randomness of the random string programmed in the memory cells according to the invention. In fact, if a random number generator were available of sufficiently high quality then one may just as well burn-in a random value into the one-time programmable memory cells. However, a low quality random number generator is sufficient to mask a lopsided distribution of programmed memory cells within the multiple memory cells.

The random number generator may generate a permutation of addresses of the memory cells. For example, the memory cells may be consecutively numbered. The random number generator may generate a permutation of the addresses. Referring to FIG. 2a, suppose that the number of memory cells is 16, numbered from 1 to 16. Then the random number generator could produce the permutation 2 12 3 15 9 7 11 8 5 10 6 13 4 16 14 1. For example, the random number generator could be seeded by the data in the memory cell after an iteration, say after the first iteration using the data in memory cells 211.

In an embodiment, memory device 100 comprises a non-volatile helper data memory 160 and a validation unit 164 arranged to correct the data in the multiple memory cells using the helper data. The helper data is computed by an authentication unit 162 arranged to compute helper data over the data in the multiple memory cells after the threshold criterion has been reached, and to store the helper data in the helper data memory of the memory device, the helper data comprising redundancy information for the data in the multiple memory cells. The authentication unit 162 may be comprised in memory device 100 or in the programming device 110. Authentication unit 162 has access to the multiple memory cells.

The one-time programmable memory cells may not be entirely reliable. There is a risk that a memory cells is read out as programmed even though the memory cell was not programmed by the control unit, or vice versa. If a key is derived from the memory cells, this possibility will have serious repercussions. Even a one bit difference in a cryptographic key will completely fail in authentication/decrypting etc. data protected with that key. In other words, such a 1-bit failure may turn the memory device inoperable due to cryptographic failures.

In the art of physical unclonable functions this problem is addressed using so-called helper data. Helper data is redundancy information for the data in the multiple memory cells. For example, during an enrollment phase, programming device 110 programs the multiple memory cells 120 according to the invention, has helper data determined using authentication unit 162 and stores the helper data in helper data memory 160. Later when a key is needed in a use phase, validation unit 164 applies the helper data to the data in memory cells 120. Even if some memory cells give a different result in some use phases, these errors are corrected through the use of helper data.

One helper data scheme used for PUF is as follows. A random code word from an error correcting code is selected which has the same length as the number of memory cells in multiple memory cells 120. The exclusive or (XOR) between the random code word and the content of multiple memory cells 120 after programming is stored in helper data memory 160. In a use phase the helper data is XOR-ed with the content of the multiple memory cells 120 and an error correcting algorithm is applied.

A disadvantage of this helper data scheme is that long error correcting codes may be required. For example, if 128 memory cells are used, an error correcting code of dimension 128 may be used. Computing such large codes can be computationally intensive. Moreover, error correcting algorithms, especially at high dimensions, tend to be computationally complex. Decoding of, say, a BCH code requires complicated polynomial computations.

On the other hand, the reliability of one-time programmable cells was found to be very high. In one experiment, reliability of over 99% was measured even at adverse environmental circumstances. The inventors realized that this high reliability compared to typical reliability in physical unclonable functions offers an opportunity to significantly simplify the computation of helper data and the correction of errors in the multiple memory cells.

In an embodiment, authentication unit 162 is arranged to compute a first hash over at least a first part of the data in the multiple memory cells after the threshold criterion has been reached, the helper data comprising the first hash.

Validation unit 164 is arranged to compute the first hash over the first part of the data in the multiple memory cells, and to compare the computed first hash with the stored first hash in the helper data memory, if the computed first hash and the stored first hash are different trying a limited number of corrections to the data until a hash computed over the corrected data equals the stored hash.

The hash is preferably a cryptographic hash, e.g., such that it is infeasible to find two different messages with the same hash value. Examples of hash functions are SHA1, SHA2, RIPEMD, etc.

Figure 3A:

For example, FIG. 3a schematically shows multiple memory cells 311 after programming. A hash value 312 is computed over all data in memory cells 311 by authentication unit 162 during the enrollment phase.

In a use phase, validation unit 164 computes the hash again over the same multiple memory cells 311. If the computed hash is the same as the hash stored in helper data memory 160, then the validation unit 164 has determined that no errors occurred. Unfortunately, there is a chance that the computed hash and the stored hash do not agree. This may occur if one or more of the memory cells gives a different result in some readings; in particular, if this occurs between the reading of the multiple memory cells when the hashes were computed and the reading of the multiple memory cells when they are used, say to compute a cryptographic key.

If the computed hash differs from the hash stored in helper data memory 160, then the authentication unit 164 has determined that errors occurred. Due to the high reliability of the memory cells, the authentication unit may assume that only a limited number of errors occurred. For example, the limited number may be pre-determined. For example, the number of corrections tried may be limited, by only trying errors caused by a 1 bad memory cells, or at most 2 bad memory cells, or at most 3 bad memory cells. Validation unit 164 tries each combination of a limited number of bits until a correction is found such that the hash over the corrected data equals the stored hash.

For example, in an embodiment the limited number of corrections is 1. In that case validation unit 164 will try to invert each of the bits in the memory cells until the faulty bit has been found. To compute the computations, a copy in volatile memory may be made of the memory cells.

For example, the following validation algorithm in pseudocode may be used in a use phase to correct a single error, e.g., wherein the limited number of bits is 1.

1. Read out the multiple memory cells and assign to bit string currentData
2. Read a hash out of the helper data, the hash being previously obtained and stored during an earlier enrollment state, assign to storedHash
3. Compute computedHash as the hash over currentData. If computedHash equals storedHash, terminate the validation algorithm with success
4. For index=1 to number of bits in currentData
5. Compute computedHash as the hash over currentData wherein a bit with address equal to index is inverted. If computedHash equals storedHash, terminate the validation algorithm with success
6. Terminate the validation algorithm with failure If the algorithm terminated with success, some further use may be made of currentData. For example, the currentData may be used as a cryptographic key, possibly after processing with a key derivation algorithm. For example, currentData may be used as an identifier for identification of the memory device. The above algorithm assumes that the bits in currentData are addressed with numbers from 1 to n, with n the number of cells. The algorithms may be extended to correcting multiple bits by trying more combinations of bits in the loop.

Figure 3B:
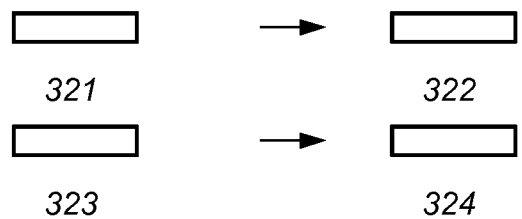

FIG. 3b shows a variant in which the multiple memory cells are portioned into multiple parts, e.g., groups. Shown in FIG. 3b are part 321 and part 323. During enrollment, a hash is computed over each part by the authentication unit. The hash computed over part 321 is shown as hash 322. The hash computed over part 323 is shown as hash 324. The correction proceeds as in FIG. 3a except over multiple parts. Corrections can be made independently of the other part. This embodiment has the advantage that multiple errors can be found, without increasing the number of tests done during validation. For example, if two errors occurred, one in part 321 and one in part 323, then these errors can be found and corrected independently.

Figure 3C:
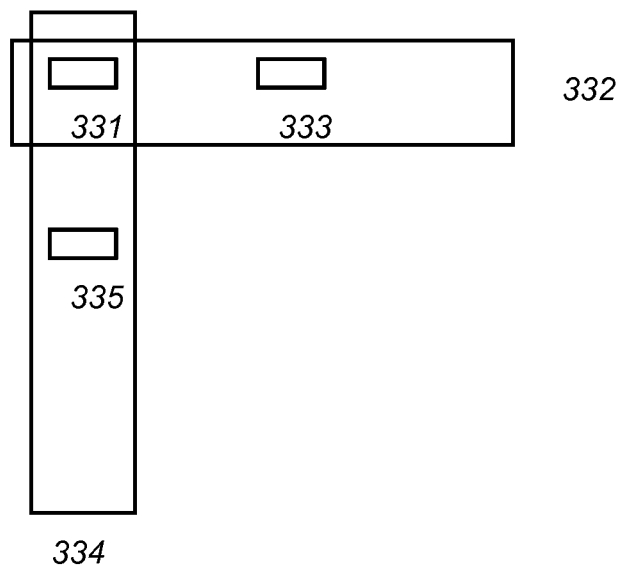

FIG. 3c illustrates an embodiment in which the authentication unit also computes multiple hashes over multiple parts of the data in the multiple memory cells. In the embodiment illustrated by FIG. 3c at least some of the hashes are computed over overlapping parts of the data. For example, the data in the multiple memory cells is portioned into groups, including groups 331, 333 and 335. First stored hash 332 is computed and stored by authentication unit 162 over the part formed by groups 331 and 333. Second stored hash 334 is computed by authentication unit 162 over the part formed by groups 331 and 335 and stored in helper data memory 160.

Validation unit 164 computes multiple hashes over the multiple parts of the data in the multiple memory cells. In this case, validation unit 164 computes a first computed hash over the part formed by groups 331 and 333, and a second computed hash over the part formed by groups 331 and 335.

If the first stored hash 332 differs from first computed hash and the second stored hash 334 differs from second computed hash, the validation unit may conclude that likely an error occurred in overlapping data 331. Validation unit 164 may try the limited number of corrections to the overlapping data until at least one of the first and second computed hash computed over the corrected part equals the corresponding stored hash. In this case, validation unit 164 may use the same algorithm as in FIG. 3a but limits its self to correction in the overlapping part 331. In an embodiment, validation unit 164 only tries single-bit corrections in the overlapping part 331.

In an embodiment, if the first stored hash 332 differs from first computed hash and the second stored hash 334 does not differ from the second computed hash, the validation unit may conclude that likely an error occurred in data part 333. In this case, validation unit 164 may try corrections in data part 333, e.g., a data part over which the first stored hash was computed, but over which the second stored hash was not computed.

Using overlapping hashes allows a faulty memory cells to be found quickly, since only corrections are tired for memory cells in a smaller group of memory cells. For example, a single bit error may be found three time faster using the two overlapping hashes shown in FIG. 3c compared to the embodiment of FIG. 3a using a single hash. Moreover, FIG. 3c needs only to store two hashes, whereas a comparable embodiment of FIG. 3b applied to three groups uses three hashes.

Figure 3D:
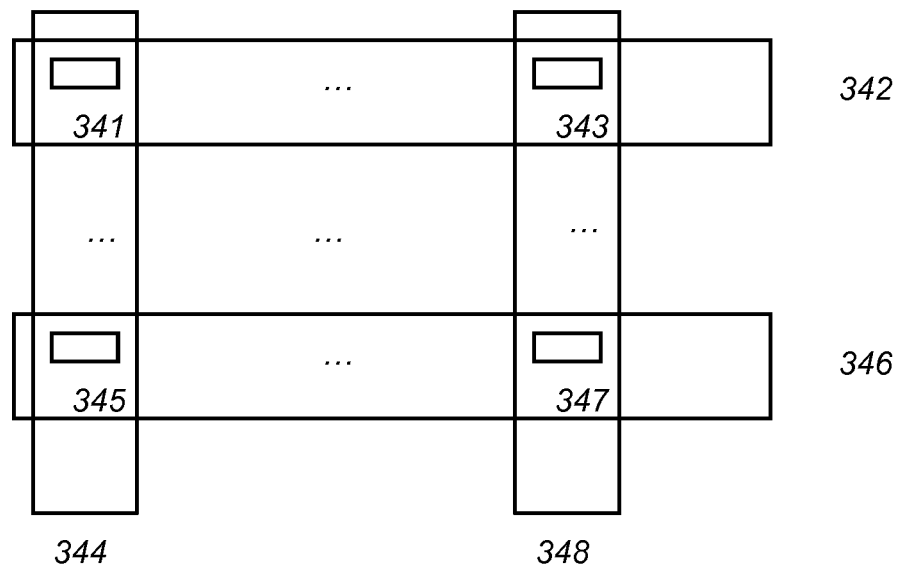

FIG. 3d illustrates a further variant of FIG. 3c. Shown are four groups of memory cells: groups 341, 343, 345 and 347. Four parts are formed by groups 341 and 343; 345 and 347; 341 and 345; 343 and 347; over which hashes 342, 346, 344, and 348 are computed respectively and stored in helper data memory 160. In case of a single faulty memory cells, exactly two stored hash will differ from stored hashed, pinpointing where the error occurred. The configuration may be extended to two multiple groups. The memory cells are divided into multiple groups and arranged in a square matrix of rows and columns. Hashes are computed over parts formed by groups that are in the same column or in the same row. In an embodiment, at least two columns and at least three rows are used. Note that in an embodiment of two columns and three rows, the number of groups is 6, whereas, the number of stored hashes is only 5.

In an embodiment, it is preferred that overlap is a multiple of 8 bits, e.g., exactly 8 bits. For example, taking the configuration of FIG. 3d, the data in the multiple memory cells may be arranged in a square array of bytes, each hash being computed over all bytes in either a row or a column.

A validation algorithm suitable for validation unit 164 is described in more mathematical terms below. Let $e_i$ denote the vector consisting of all zeroes except for position i where it equals to 1. Symbolically, $e_i=(0, \ldots, 1, 0, \ldots 0)$. We describe a solution based on a hash function h as defined above. During enrollment, a measurement $X^N$ (also known as a sensing or a reading) of the multiple one-time programmable memory cells is taken and its hash $h(X^N)$ is computed. This hash value $h(X^N)$ is stored as helper data (also referred to as an activation code) in non-volatile memory in the system. This can be a separate NVM memory than the one that is used for the multiple memory cells but it can also be the same.

During reconstruction, a noisy value $Y^N$ of $X^N$ is observed. In order to recover $X^N$ from $Y^N$ the following procedure may be used.

1. Compute $h(Y^N)$ and compare to $h(X^N)$. If $h(Y^N)=h(X^N)$, then $Y^N=X^N$ and stop, else go to step 2.

2. For each i starting at 1, compute: $h(Y^N+e_i)$. Then compare, $h(Y^N+e_i)==h(X^N)$. If $h(Y^N+e_i)=h(X^N)$, the one knows that $Y^N+e_i=X^N$ and stop; else go to i+1. If i=N and no equality was found, this step can optionally be repeated N(N−1) times by comparing $h(Y^N+e_{ij})==h(X^N)$ and drawing an analogous conclusion if one finds equality. ($e_{ij}$ is vector consisting of all zeroes except at the positions i and j where it equals 1, we may take i<j).

The above algorithms may also be used if trying corrections is first or only tried in an overlap between two parts of the data in the multiple memory cells.

In an embodiment, Step 2 is repeated always the same number of times, e.g., N times instead of stopping when a solution is found. That guarantees that all computations are equally lengthy and hence do not leak timing information. This avoids so called side channel attacks, based on the timing side channel.

When a cryptographic hash function is used, this procedure has some inherent authentication. When an attacker tries to change the helper data by a single bit, this has drastic consequence on finding the correct $X^N$. Linear and sensitivity attacks become substantially more difficult by using this approach.

In some one-time programmable memory cells one or more additional settings registers sr have to be set in order to allow the user to use the memory as a PUF. For example, in a particular one-time programmable memory the setting registers sr have to be set in the correct mode. In order to make sure that the value of the setting register cannot be tampered with one can add the value of sr to the helper data, e.g., compute and store $h(X^N\|sr)$. To validate the settings register used to read out the multiple memory cells is also included in the hash. This helps to ensure that reading is done with the same settings register during validation as during enrollment.

Alternatively, one can also do the following approach: sr, $h(X^N\|sr)$, $h(X^N)$. This will more clearly indicate whether the error comes from environmental influences or from an attack. For example, one may first perform the check on $h(X^N)$.

Another approach is to use two sets of multiple one-time programmable memory cells, each programmed according to the invention: $X_1^N$ and $X_2^N$. The PUF $X_1^N$ is solely used to authenticate the settings registers, while the PUF $X_2^N$ is used for key generation only after sr was authenticated by $X_1^N$. Hence, one could store as helper data: sr, $h(X_1^N\|sr)$, $h(X_1^N)$, $h(X_2^N)$. Note that since $X_1^N$ is only used for authentication purposes, it can be substantially shorter than when it is used for generating an encryption key. For example, it is first verified that $X_1^N$ can be read and validated correctly.

This ensures that the setting register is correct. It is not required that the two parts $X_1^N$ and $X_2^N$ have the same size.

In case there are some more errors in the source $X^N$, one may split up $X^N$ into smaller pieces and store the hashes of the smaller pieces next to each other as helper data or activation code.

In an embodiment, memory device 100 comprises further multiple one-time programmable memory cells. An identifier is stored in the further multiple one-time programmable memory cells. For example, the identifier may be stored in the further memory cells by programming device 110. For example, the identifier may be stored in the further memory cells during manufacture or testing of device 100. In an embodiment, during use, e.g., during a use phase, of memory device 100 a cryptographic key is determined from at least a subset of the multiple memory cells. In an embodiment, a cryptographic key is determined both from the at least a subset of the multiple memory cells and the identifier. The identifier may be a number used once (nonce). The identifier may be a random number. The identifier may be a Globally Unique Identifier (GUID). This has the advantage, that if the programming of the memory cells fails for some reason, or if the entropy is too low, at least a minimum of diversification of the cryptographic keys will be established through the identifiers.

In an embodiment, the memory device comprises a memory block, the memory block comprising multiple memory cells 120, as well as further multiple one-time programmable memory cells (not separately shown).

In an embodiment, the cryptographic key is determined from a subset of the multiple memory cells. The memory cells each have addresses, e.g., a consecutive numbering of the memory cells. The addresses of the memory cells used to compute the cryptographic keys are stored in yet further multiple one-time programmable memory cells (not separately shown). For example, if the key is determined from cells 4, 7, 3, 14, . . . , etc. but not from say cells 1, 2 and 3, only the sequence of addresses 4, 7, 3, 14, . . . , etc. is stored. This has effect that if an attacker somehow gains access to the random bit string stored in the multiple memory cells, the actual key is still obfuscated from him.

In an embodiment, the memory device comprises a non-volatile helper data memory 160, and a non-decreasing counter (not separately shown in the figures). The non-decreasing counter comprises a further multiple of one-time programmable memory cells. For example, in an embodiment, the non-decreasing counter is embodied as a sequence of one-time programmable memory cells, which are initially all in the not-programmed state. The non-decreasing counter can be increased by programming a next memory cell in the further multiple. For example, the number of programmed cells in the further multiple may correspond to the value of the non-decreasing counter. Since the cells are one-time programmable, the counter cannot be decreased. For example, if 5 memory cells are used, the non-decreasing counter can encode the values 0, 1, 2, 3, 4, 5 as the sequences 00000, 00001, 00011, 00111, 01111, 11111. In the example, the further multiple is represented as a linear sequence which is programmed from right to left. For example, the further multiple cells used for the non-decreasing counter and the memory cells used to obtain a PUF value may be contained in a single block of one-time programmable memory. For the non-decreasing counter, the regular programming voltage is used.

The memory device or the programming device comprises an authentication unit 162. The authentication unit is arranged to compute helper data over the data in the multiple memory cells after the threshold criterion has been reached, the helper data comprising redundancy information for the data in the multiple memory cells, determine a cryptographic verification key, determine an authentication token computed over the helper data and the non-decreasing counter using the verification key, store the authentication token, and the helper data in the helper data memory of the memory device.

The order of these operations may be varied, for example, the verification key may be determined before the helper data. The helper data may be simplified helper data as described herein, e.g., comprising one or more hashes over the data in the multiple memory cells, or it may be conventional helper data. For example, helper data may be formed by XOR-ing the data in the multiple memory cells with a code word from an error correcting code. The code word is typically randomly selected, e.g., using a random number generator. The random number generator may be pseudo random and seeded with PUF data. Said PUF data is preferably obtained from a different PUF than the one used to obtain the operational key.

The authentication token may be a message authentication code (MAC), e.g., HMAC using SHA-2, CBC-MAC, etc., computed over data, e.g., the helper data and a counter value, and using as key the verification key. An authentication token may also be a signature computed using an asymmetric key, e.g., using ECDSA. In the latter case, a private asymmetric key is derived from the noisy bit string and used to sign the helper data and/or the second voltage indicator. Verifying a token computed with an asymmetric key does not require recomputation of the token, but instead uses verification using the public key corresponding to the private key. The public key may also be computed from the noisy bit string, e.g., derived from the private key. For simplicity, we will assume the verification key is a symmetric key.

The authentication token may be computed by authentication unit 162, e.g., during an enrollment phase. In an embodiment, authentication unit 162 is arranged to compute an authentication token over the helper data and the non-decreasing counter using the verification key, and store the authentication token in the helper data memory. The authentication token may also be computed by an authentication unit 162 comprised in an external programming device.

The authentication token may be computed over multiple elements in the helper data memory. For example, if helper data comprises hashes over a settings register etc. (see embodiments herein), the authentication token may be computed over the helper data, the non-decreasing counter, together with the additional elements, e.g., hashes over the settings register; also, e.g. meta-data may be included such as creation-date and the like. In an embodiment, the non-decreasing counter has the value 0 for the first enrollment and is increased for each following enrollment. The non-decreasing counter may have a maximum value after which a next enrollment is not possible.

The memory device comprises a validation unit 164. Validation unit 164 is arranged to correct the data in the multiple memory cells using helper data in the helper data memory. Since some cells in the multiple memory cells are programmed very close to the edge between programmed and not-programmed it may happen that some cells do not always produce the same value when read out. Validation unit 164 can correct these variations using the helper data. In general, the corrected data may be used to compute a cryptographic key, which we will term here the cryptographic operational key to distinguish it from the verification key. The operational and verification key may be the same, but they may also have been diversified. For example, a key derivation function may be applied to the corrected data but with different diversifying inputs to produce different operational and verification key from the same data. One may also compute the operational and verification key over corrected data which is not fully overlapping, or possibly even non-overlapping. The operational key may be used for any cryptographic purpose, e.g., authenticating the device, authentication financial transactions, decrypting incoming communications; a public/private key pair may be derived from the operational key, etc.

There are a few options to determine the verification key. In a first embodiment, the verification key is determined by the authentication unit from at least part of the data in the multiple memory cells. For example, the verification key may be a hash of the data in the multiple memory cells, possibly concatenated with a diversifying string, e.g., the string "0". This way to compute a verification key is compatible with all types of helper data, both the conventional as well as the simplified helper data (e.g., using hashes). The operational key may be computed in the same way, except that the diversifying string is different, e.g., the string "1". In this case, the validation unit corrects the data in the multiple memory cells and uses the corrected data to determine the verification key in the same way as the authentication unit did.

In a second embodiment, the verification key is determined by the authentication unit from a code word used to compute the helper data. In this case, the helper data may be formed as the difference, e.g. the XOR-difference, between the data in the multiple memory cells and a code word from an error correcting code. The verification key may be determined from this code word. For example, the verification key may be a hash of the code word, possibly concatenated with a diversifying string, e.g., the string "0". The operational key may be computed in the same way, except that the diversifying string is different, e.g., the string "1". In this case, the validation unit uses the helper data to obtain a correctable code word, corrects the correctable code word and determines the verification key from it in the same way as the authentication unit did. The two options may be combined. In both options, a key derivation function may be used instead of a hash.

Thus, the verification unit determines the verification key from at least part of the data in the multiple memory cells and the helper data. The authentication unit may determine the verification key from the data in the multiple memory cells, but also independent therefrom. Note that the random code word used to construct the helper data, is not itself part of the helper data.

Validation unit 164 is arranged to verify the authentication token using the verification key. For example, the validation unit 164 may be arranged to compute the same token over the same data, or at least what should be the same data, e.g., helper data and the non-decreasing counter. That is the token is recomputed over helper data taken from the helper data memory and a counter value taken from the non-decreasing counter. If an attacker modified the helper data, e.g., to force a roll-back to a previous key, the authentication token stored in helper data memory 160 is likely different from the token computed by validation unit 164. If validation unit 164 detects this, it may take appropriate action, e.g., generate a signal indicating a possible attack, generate an error message, delete the operational key, etc.

The helper data and authentication token may be computed by authentication unit 162, e.g., during an enrollment phase. Also, the multiple one-time programmable cells will also be programmed during the enrollment to obtain a PUF value.

During an operational phase, the multiple memory cells are read out obtaining a possibly noisy bit string. Note that the noisy bit string may differ somewhat from the string read during the enrollment phase. The helper data is retrieved from helper data memory 160. A verification key is computed from the noisy bit string and the helper data. For example, the noisy bit string is corrected using the helper data, and the verification key is computed from the corrected bit string. Alternatively, the helper data comprises a difference between a code word and the string read during the enrollment phase. By adding the difference to the noisy bit string a correctable noisy code word is obtained. By error correcting the noisy code word, the code word is obtained again. From the corrected code word and the helper data the data read during enrollment may be recovered. In this case, the verification key may be computed over the recovered code word, or over the corrected data.

Using the verification key an authentication token stored in helper data memory 160 is verified over the helper data and the non-decreasing counter. If the authentication token is successfully verified, the operational key is computed (or alternatively it is computed earlier, but deleted if the token does not verify).

If at some point, for security reasons the operational key needs to be renewed, the non-decreasing counter may be increased and the enrollment process may be executed again. Repeating the enrollment process may include attempting to program the OTP cells. For example, all cells or all not-programmed cells may be programmed again with a voltage that causes about 50% of the cells to program. For example, the stopping criterion may be slightly increased, e.g., by 1% to ensure that at least some cells will be programmed. After the programming, the helper data, verification key, and authentication tokens are computed again. Note that the operational key will have changed in this case. Alternatively, the new enrollment skips the programming phase. In the latter case, helper data may be used that includes a random component, e.g., a random code word as discussed herein. In the latter case, the operational key is derived from the corrected code word, rather than from the data directly.

Thus, a key revocation mechanism may be constructed which includes a version number with the authenticated helper data, and which stores a monotonically increasing counter value in a set of dedicated OTP bits. The monotonically increasing counter value may comprise a set of dedicated OTP bits that are, e.g., programmed sequentially (one by one) every time the counter needs to be increased. The PUF implementation may check that the counter value in OTP matches with the version number in the signed helperdata. If the values don't match, the key should not be output. Below an example is given:

| Valid key version | OTP Counter | Matching signed helperdata |
|---|---|---|
| 1 | 00001 | $[K'](W\|\|1) |
| 2 | 00011 | $[K'](W\|\|2) |
| 3 | 00111 | $[K'](W\|\|3) |

Here $[K'] denotes, signing, e.g., MAC-ing, over the data in brackets. W denotes helper data, and || is concatenation. Note that both key K' and helper data W may have different values in each row.

In an embodiment, when a key needs to be revoked, a new enrollment is done resulting in new helperdata that is signed including an increased version number. The counter value in OTP is also increased. A replay attack of old helperdata will fail because the version number in the signed helperdata does not match with the current counter value in OTP.

In an embodiment, the threshold criterion depends on the value of the non-decreasing counter. For example, the threshold criterion may be reached when the percentage of memory cells in the programmed state is at least a threshold percentage, wherein the percentage depends on the enrollment number. The counter-value depend strictly increases with the threshold percentage. The threshold criteria may be stored in memory, e.g., in a look-up table, e.g., in read-only memory. The threshold criteria may be fixed in the programming, etc.

For example, call $p_i$ the number of additionally programmed cells in enrollment i. The value $p_0$ is the aimed-for number of programmed cells in the initial enrollment. After enrollment i, about $\Sigma_{j=0}^{j=i} p_j$ cells are programmed. This need not be exact; as discussed herein, there are various ways to ensure or approximate a number of programmed cells. Call the number of one-time programmable cells n. Let b be a security parameter that indicates the entropy in the bit strings produced by the enrollment. In an embodiment, we may select $p_i$ such that the following equation approximately holds:

$$2^b = \binom{n}{p_0} = \binom{n-p_0}{p_1} =$$
$$\binom{n-p_0-p_1}{p_2} = \binom{n-p_0-p_1-p_2}{p_3} = \binom{n-p_0-p_1-p_2-p_3}{p_4} = \ldots$$

For example, each $p_i$ may be chosen as the smallest integer such that the corresponding binomial is at least $2^b$.

As an example, if n=250, and b=80, we may choose the following values

| Enrollment (i) | $p_i$ | $\Sigma p_i$ |
|---|---|---|
| 0 | 16 | 16 |
| 1 | 16 | 32 |
| 2 | 17 | 49 |
| 3 | 17 | 66 |
| 4 | 18 | 84 |
| 5 | 19 | 103 |

The threshold percentage may be set at 6.4% for the first enrollment, up to 41% for the fifth enrollment. Overshoot in programming may be compensated for by selecting a larger value for b.

An advantage of using one-time programmable memory based PUF, e.g., compared to volatile memory based PUFs, is its availability to keep state information which can be used for key revocation. PUFs based on volatile memory (such as SRAM-PUFs) have the security advantage that no sensitive data is present in the device as soon as the power is turned off. This makes it very difficult or nearly impossible for an attacker to read out such data even with a physical attack. This security advantage also comes with a drawback in certain use cases: there is no inherent state that can be used for key revocation.

In order to be able to revoke keys, a mechanism is introduced that is able to determine whether a certain key is still valid or not, e.g., by storing some state information in memory that cannot be manipulated. Note that, if the security state of a device requires this, the operational key may be removed from the device by overwriting the memory cells, e.g., by regularly programming them. This may turn the device inoperable, though.

It is noted that this authentication unit, non-decreasing counter, helper data memory and validation unit may also be applied in a memory device with a different PUF, e.g., based on volatile memory rather than on non-volatile memory. For example, start-up noise in a volatile memory, such as SRAM, may be used as a PUF value. The helper data uses preferably a random code word in this case.

Figure 4:
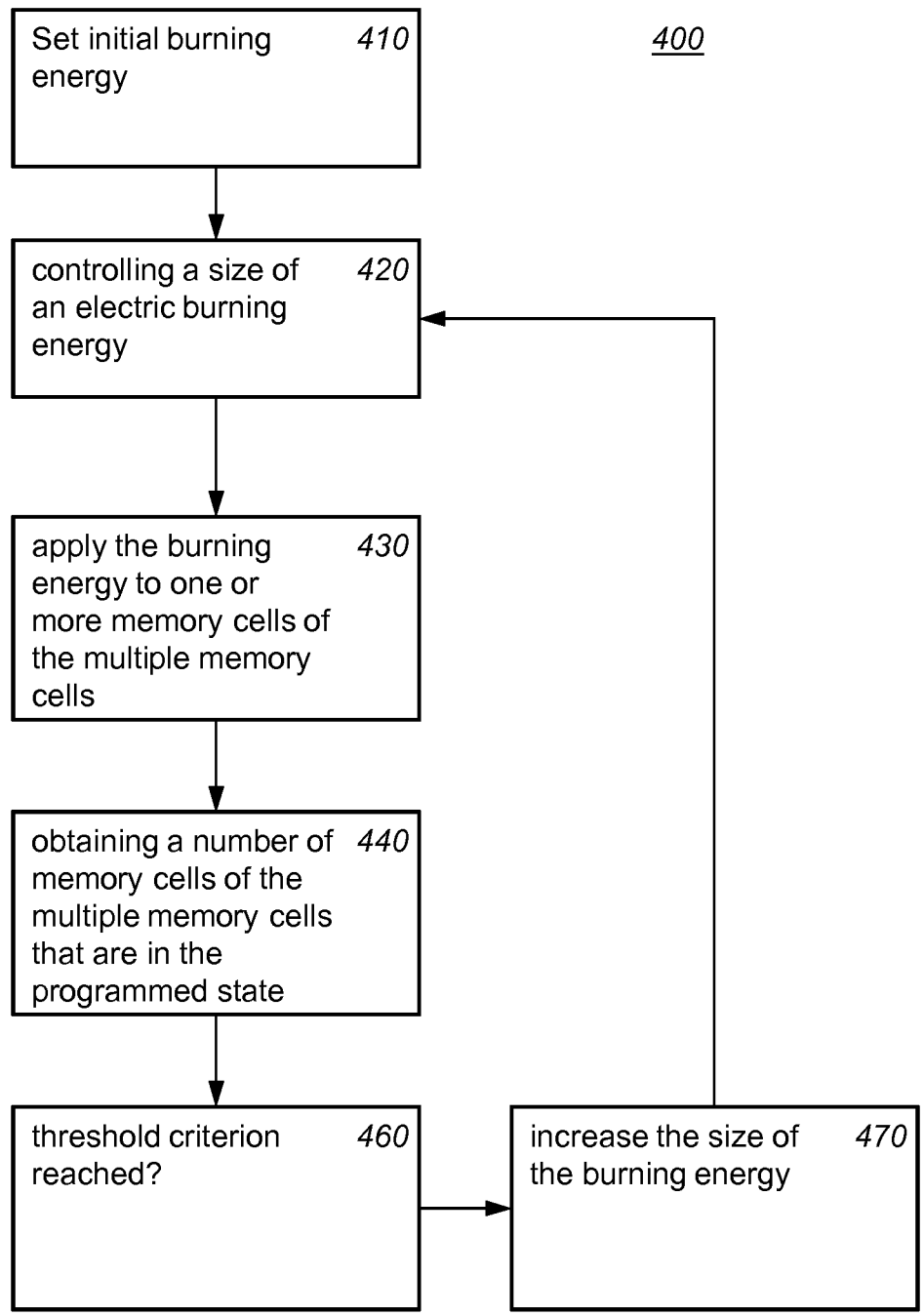

FIG. 4 illustrates an embodiment of a method 400. The method obtains and stores a random bit string in multiple one-time programmable memory cells 122. For example, the method may obtain and stores a random bit string in a memory device 100. Method 400 may be used both internal and external to memory device 100. Method 400 comprises:

Setting 410 an initial burning energy. In case the burning energy is already set to a suitable initial level, this may be skipped. The initial burning energy is preferably set so that not more than 50% of the memory cells will change from not-programmed to programmed.

Controlling 420 a size of an electric burning energy. The burning energy may be controlled, e.g., by writing a settings register of the memory cells, or setting a reference voltage on a pin, charging a voltage pump, etc.

Applying 430 the burning energy to one or more memory cells of the multiple memory cells. For example, the burning energy may be applied to all of the multiple memory cells. For example, multiple memory cells may be partitioned into groups, and the burning energy may be applied to a group thereof. The groups may be non-empty, and comprise say 1 or more cells, or 8 or more cells, etc.

Obtaining 440 the number of memory cells of the multiple memory cells that are in the programmed state. The method may also obtain the number of programmed cells in one or more groups, and based on that decide to program more groups before increasing the burning energy.

Evaluating 460 the threshold criterion. If the threshold criterion is not reached, then the method continues with Increasing 470 the size of the burning energy. After the increase, the method can iteratively continue at controlling 420 until the threshold criterion is reached.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, multiple memory cells may be programmed in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 5:
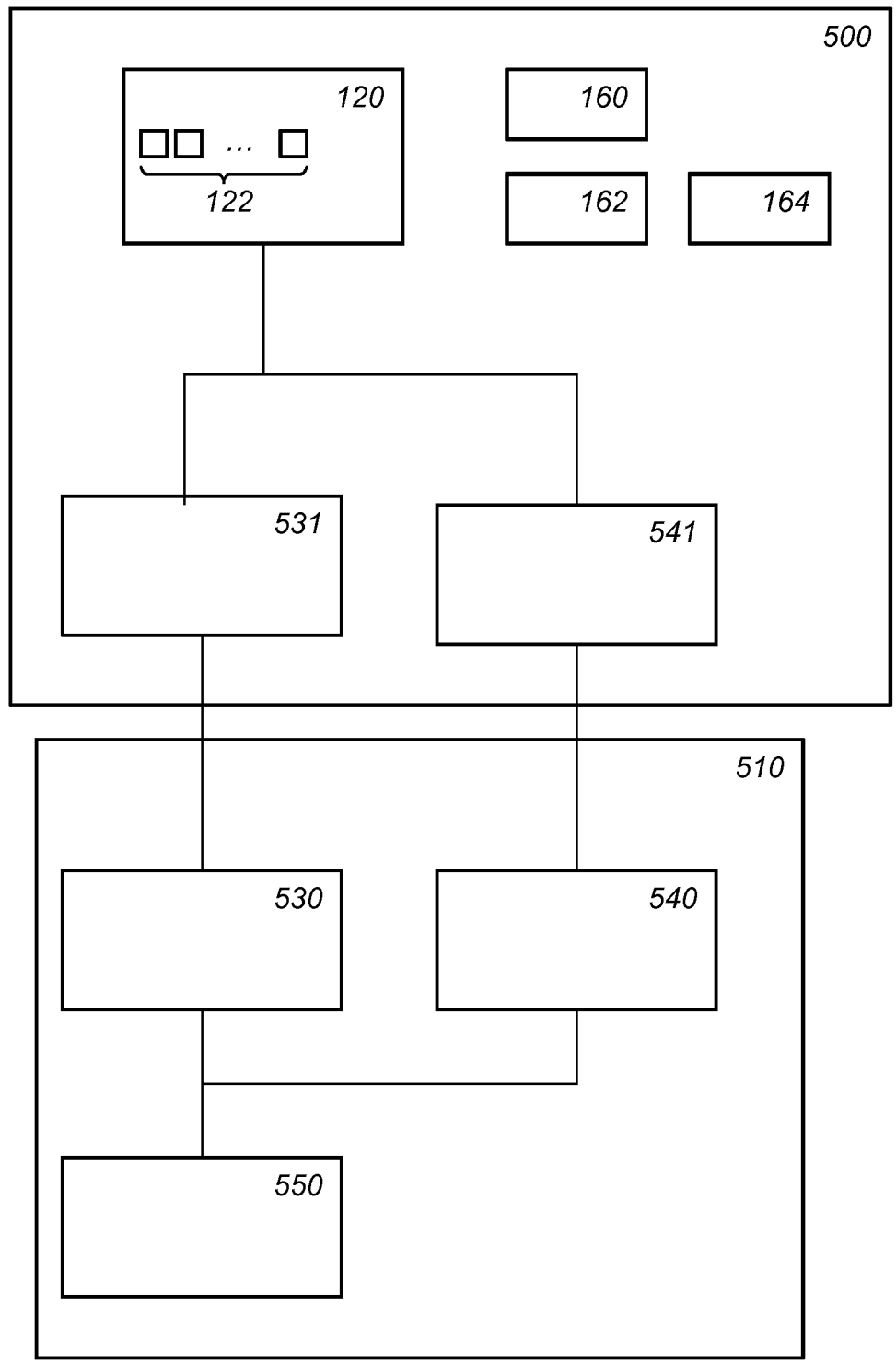

FIG. 5 schematically shows a memory device 500 with an external programming device 510. Memory device 500 is arranged for use with programming device 510. Programming device 510 is external to memory device 500. Any of the above programming devices may be used with memory device 500 modified to use appropriate interfaces to the memory device. For example, programming device 510 may be used during manufacture or testing of memory device 500 to set it up once with a random bit string. In an embodiment, writing means are avoided or reduced on memory device 500. This reduces costs, and may also increase security as a vector of attack is eliminated from memory device 500. On the other hand, the external interface may need to be protected.

Memory device 500 comprises multiple one-time programmable memory cells 122, e.g. in a memory block 120, similar to memory device 100. The type of one-time programmable memory cells may also be the same.

Memory device 500 comprises
 a controllable energy source interface 531 arranged to receive an electric burning energy, and to apply the burning energy to a selected one of the multiple memory cells.
 an internal status unit 541 arranged to access the multiple one-time programmable memory cells and count the number of memory cells of the multiple memory cells being in the programmed state, and to send the number of memory cells to the programming device.

Note that the internal status unit 541 may be arranged to only give the total number of programmed cells in the multiple memory cells, or in a subgroup thereof. Having an interface that will not give the status of individual cells reduces the chances that this interface may be subverted and used to leak the random string from memory device 500. Programming device 510 is similar to programming device 110, except that it can only interface with the memory cells through interface of memory device 500. Programming device 510 comprises a controllable energy source 530 arranged to provide the controllable burning energy to interface 531. Status unit 540 arranged to obtain the status from interface 541. Control unit 550 may be the same as control unit 150.

Typically, the devices 100, 110, 500, and 510 each comprise a microprocessor (not separately shown) which executes appropriate software stored at the devices; for example, that software may have been downloaded and/or stored in a corresponding memory, e.g., a volatile memory such as RAM or a non-volatile memory such as Flash (not separately shown). Alternatively, the devices may, in whole or in part, be implemented in programmable logic, e.g., as field-programmable gate array (FPGA). Devices XXX and YYY may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, programming device 110 and/or 510 comprises a controllable energy source circuit, a status circuit, a control circuit. In an embodiment, memory device 100 and/or 500 comprises a validation circuit and an authentication circuit. The circuits may be a processor circuit and storage circuit, the processor circuit executing instructions represented electronically in the storage circuits. The circuits may also be, FPGA, ASIC or the like.

Figure 6A:
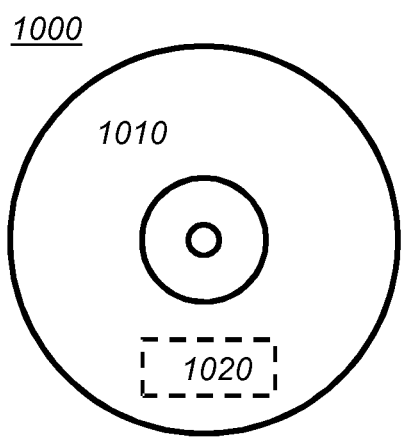

FIG. 6a shows a computer readable medium 1000 having a writable part 1010 comprising a computer program 1020, the computer program 1020 comprising instructions for causing a processor system to perform a method of programming multiple one-time programmable memory cells, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of programming multiple one-time programmable memory cells.

Figure 6B:
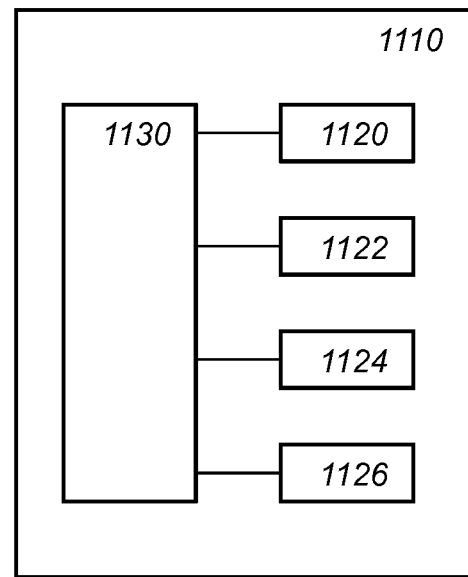

FIG. 6b shows in a schematic representation of a processor system 1140 according to an embodiment. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. A programming device arranged to obtain and store a random bit string in a memory device, the memory device comprising multiple one-time programmable memory cells, a memory cell having a programmed state and a not-programmed state, the memory cell being one-time programmable by changing the state from the not-programmed state to the programmed state through application of an electric burning energy to the memory cell, the memory cells being partitioned into multiple groups of memory cells, the programming device comprising:
    a controllable energy source arranged to supply the electric burning energy, the controllable energy source having a control interface for controlling a size of the electric burning energy, the controllable energy source being arranged to apply the electric burning energy to a selected one of the multiple memory cells,
    a status unit arranged to obtain the number of memory cells of the multiple memory cells that are in the programmed state,
    a control unit arranged to iteratively apply the controllable energy source to a group of memory cells of the multiple groups of memory cells into which the memory cells are partitioned and increase the size of the electric burning energy through the control interface, until the number of memory cells in the programmed state reaches a threshold criterion, thus obtaining the random bit string stored in the multiple one-time programmable memory cells,
    wherein the status unit is arranged to determine a number of memory cells programmed in a group of memory cells in a previous iteration, and wherein the control unit is arranged to:
        increase the size of the electric burning energy if the number of memory cells programmed in a previous iteration is below a lower bound, and/or
        decrease the size of the electric burning energy if the number of memory cells programmed in a previous iteration is above an upper bound.

2. A programming device as in claim 1, wherein the threshold criterion is reached when the percentage of memory cells in the programmed state is at least a threshold percentage.

3. A programming device as in claim 2, wherein the group of memory cells to which a particular electric burning energy is applied in an iteration before the threshold criterion is applied is determined before the iteration and is of size at least two, and the threshold percentage is below 50%.

4. A programming device as in claim 2, wherein the group of memory cells to which a particular electric burning energy is applied in an iteration before the threshold criterion is applied is determined before the iteration and is of size at least two, and the threshold percentage is determined from an expected number of memory cells that will change from the not-programmed state to the programmed state.

5. A programming device as in claim 1, wherein the control unit is arranged to apply a statistical randomness test to the multiple memory cells to estimate if the entropy in the multiple memory cells is sufficient, and to increase the number of memory cells in the multiple one-time programmable memory cells if the entropy according to the randomness test is insufficient.

6. A programming device as in claim 1, comprising a random number generator, the group of memory cells to which the electric burning energy is applied being determined by the control unit from random numbers generated by the random number generator.

7. A programming device as in claim 1, wherein the memory device comprises
   a non-volatile helper data memory, and
   a validation unit arranged to correct the data in the multiple memory cells using helper data in the helper data memory, the memory device or the programming device comprising
   an authentication unit arranged to compute helper data over the data in the multiple memory cells after the threshold criterion has been reached, and to store the helper data in the helper data memory of the memory device, the helper data comprising redundancy information for the data in the multiple memory cells.

8. A programming device as in claim 7, wherein
   the authentication unit is arranged to compute a first hash over at least a first part of the data in the multiple memory cells after the threshold criterion has been reached, the helper data comprising the first hash, and
   the validation unit is arranged to compute the first hash over the first part of the data in the multiple memory cells, and to compare the computed first hash with the stored first hash in the helper data memory, if the computed first hash and the stored first hash are different trying a limited number of corrections to the data until a hash computed over the corrected data equals the stored hash.

9. A programming device as in claim 7, wherein
   the authentication unit is arranged to
   compute multiple hashes over multiple parts of the data in the multiple memory cells after the threshold criterion has been reached, at least some of the multiple parts overlapping, and
   store the hash in the helper data memory of the memory device, and
   the validation unit is arranged to
      compute multiple hashes over the multiple parts of the data in the multiple memory cells,
      compare the computed multiple hashes with the stored multiple hash in the helper data memory, and
      if a first and second computed hash which are computed over overlapping parts, differ from the corresponding two stored hashes, then trying a limited number of corrections to the overlapping data until at least one of the first and second computed hash computed over the corrected part equals the corresponding stored hash.

10. A programming device as in claim 8, wherein an overlap comprises multiple memory cells, preferably a multiple of 8 memory cells.

11. A programming device as in claim 8, wherein the memory device has a reading unit arranged to access the multiple memory cells, the reading unit being controllable through a settings register,
    the hash unit being arranged to compute a first hash over the settings register together with the first part, and store the first hash in the helper data memory, and/or
    the hash unit being arranged to compute a first hash over the settings register together with the first part, and a second hash over the first part without the settings register, store the first and second hash in the helper data memory, and/or
    the hash unit being arranged to
    compute a first hash over the settings register together with the first part,
    a second hash over the first part without the settings register,
    a third hash over a second part,
    store the first, second and third hash in the helper data memory.

12. A programming device as in claim 7, wherein
    the memory device comprises a non-decreasing counter comprising a further multiple of one-time programmable memory cells, and wherein the authentication unit is arranged to
    determine a cryptographic verification key,
    determine an authentication token computed over the helper data and the non-decreasing counter using the verification key,
    store the authentication token in the helper data memory.

13. A programming device as in claim 1, wherein the controllable energy source is configured to control one or more of a voltage, current and duration to control the size of the electric burning energy.

14. A programming device as in claim 1, wherein
    the controllable energy source is arranged to increase the electric burning energy to a writing level after the threshold criterion is reached, the control unit being arranged to apply the increased electric burning energy to memory cells in the multiple memory cells that are in the programmed state.

15. A memory device comprising the programming device claim 1 and the multiple one-time programmable memory cells.

16. A memory device as in claim 15, wherein the multiple one-time programmable memory cells comprise
    multiple fuses, and/or
    multiple antifuses.

17. A memory device as in claim 15, wherein a cryptographic key is determined from at least a subset of the multiple memory cells.

18. A memory device as in claim 17 comprising a further multiple one-time programmable memory cells, an identifier being stored in the further multiple one-time programmable memory cells, the cryptographic key being determined from the subset of the multiple memory cells and the identifier.

19. A memory device as in claim 17, wherein the subset is randomly selected, addresses of memory cells in the subset being stored in yet further multiple one-time programmable memory cells.

20. A memory device arranged for use with a programming device, wherein the programming device is external to the memory device, the memory device comprising
    multiple one-time programmable memory cells, a memory cell having a programmed state and a not-programmed state, the memory cell being one-time programmable by changing the state from the not-programmed state to the programmed state through application of an electric burning energy to the memory cell, the memory cells being partitioned into multiple groups of memory cells,
    a controllable energy source interface arranged to receive the electric burning energy, the electric burning energy being provided by the programming device, and to apply the electric burning energy to a selected one of the multiple memory cells, an internal status unit arranged to access the multiple one-time programmable memory cells and determine a number of memory cells programmed in a group of memory cells in a previous iteration of the programming device, and to send said number of memory cells to the programming device.

21. A programming device arranged to obtain and store a random bit string in a memory device comprising multiple one-time programmable memory cells, a memory cell having a programmed state and a not-programmed state, the memory cell being one-time programmable by changing the state from the not-programmed state to the programmed state through application of an electric burning energy to the memory cell, the memory cells being partitioned into multiple groups of memory cells, the programming device comprising:
- a controllable energy source configured to supply the electric burning energy, control a size of the electric burning energy, and apply the electric burning energy to one or more selected cells of the multiple memory cells; and
- circuitry configured to:
  - obtain a number of memory cells of the multiple memory cells that are in the programmed state;
  - control the energy source to iteratively supply the electric burning energy to a group of memory cells of the multiple groups of memory cells into which the memory cells are partitioned and to increase the size of the electric burning energy until the number of memory cells in the programmed state reaches a threshold criterion to obtain the random bit string stored in the multiple one-time programmable memory cells;
  - determine a number of memory cells programmed in a group of memory cells in a previous iteration; and
  - control the energy source to increase the size of the electric burning energy if the number of memory cells programmed in a previous iteration is below a lower bound and/or to decrease the size of the electric burning energy if the number of memory cells programmed in a previous iteration is above an upper bound.

22. A memory device arranged for use with a programming device, wherein the programming device is external to the memory device, the memory device comprising:
- multiple one-time programmable memory cells, a memory cell having a programmed state and a not-programmed state, the memory cell being one-time programmable by changing the state from the not-programmed state to the programmed state through application of an electric burning energy to the memory cell, the memory cells being partitioned into multiple groups of memory cells;
- a controllable energy source interface arranged to receive the electric burning energy, the electric burning energy being provided by the programming device, and apply the electric burning energy to a selected one of the multiple memory cells; and
- circuitry configured to:
  - access the multiple one-time programmable memory cells to determine a number of memory cells programmed in a group of memory cells in a previous iteration of the programming device, and send said number of memory cells to the programming device.

* * * * *